Figure 1:
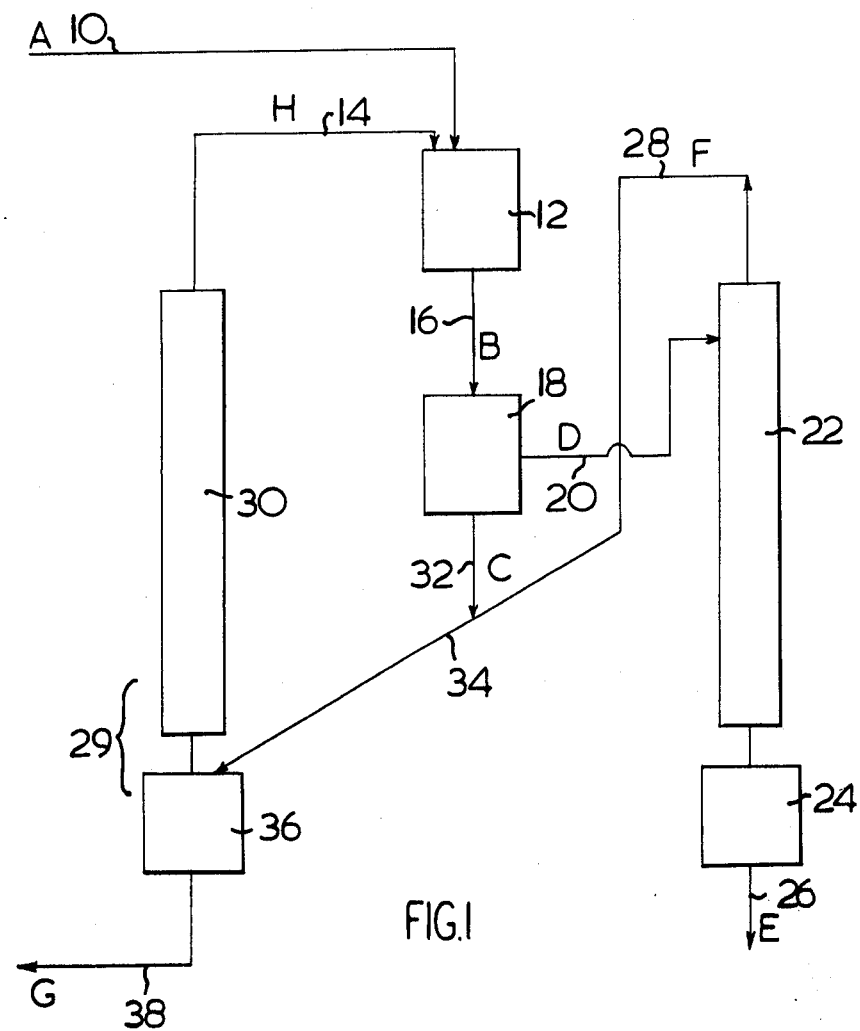

United States Patent [19]

Prescott et al.

[11] 4,051,185

[45] Sept. 27, 1977

[54] PROCESS FOR THE RECLAMATION OF ALKALI METAL ALKYLAMIDES

[75] Inventors: John Fraser Prescott, Sherwood Park; Emerson Cecil Sanford, Edmonton, both of Canada

[73] Assignee: Atomic Energy of Canada Ltd., Canada

[21] Appl. No.: 656,839

[22] Filed: Feb. 10, 1976

Related U.S. Application Data

[62] Division of Ser. No. 574,421, May 5, 1975, abandoned.

[30] Foreign Application Priority Data

May 7, 1975    Canada .................................. 199202

[51] Int. Cl.$^2$ ........................................... C07C 102/00
[52] U.S. Cl. ................................................ 260/561 R
[58] Field of Search .......................... 260/576, 561 R; 427/413, 194

[56] References Cited

U.S. PATENT DOCUMENTS 2,612,436    9/1952    Overhoff et al. ................ 423/413 X

FOREIGN PATENT DOCUMENTS 552,779    2/1958    Canada

OTHER PUBLICATIONS

Fernelius et al. Chem. Rev. vol. 20, p. 236 1937.
Chem. Abs. 8334(e), (1963), Klein et al., Isotopic Enrichment of Deuterium.

*Primary Examiner*—Allen B. Curtis
*Attorney, Agent, or Firm*—Stevens, Davis, Miller & Mosher

[57] ABSTRACT

Alkali metal alkylamides, for example, potassium methylamide or mixtures of lithium and potassium methylamides, containing impurities may be purified by a novel process. The first step of the process comprises reacting the alkali metal alkylamides, in solution in methylamine, with ammonia to form the corresponding alkali metal amides which precipitate from solution while the impurities remain dissolved. The solid alkali metal amides are then separated from the solution, e.g., by filtration. The solution containing the impurities is distilled; and the distillate, comprised of methylamine containing some ammonia, is contacted with the alkali metal amides under reflux conditions and then the solution is rectified to remove ammonia. Under these conditions the alkali metal amides react with the methylamine to form a solution in methylamine of alkali metal methylamides freed of impurities. The solution is suitable for use as a catalyst for a deuterium enrichment process.

17 Claims, 1 Drawing Figure

PROCESS FOR THE RECLAMATION OF ALKALI METAL ALKYLAMIDES

This is a division of application Ser. No. 574,421 filed May 5, 1975, now abandoned.

This invention relates generally to the preparation of alkali metal amides and alkylamides. More particularly the invention relates to the purification of alkali metal alkylamides containing impurities, whereby the alkali metal alkylamides can be re-used as catalysts in a deuterium enrichment process.

Alkali metal alkylamides in solution in a primary alkylamine, in particular potassium methylamide in solution in methylamine, have been employed as catalysts in a process for the enrichment of deuterium in hydrogen.

However it has been found that during the course of this deuterium enrichment process, there occurs a slow decomposition of the potassium methylamide catalyst to a number of products but especially to N,N'-dimethylformamidine in the form of its potassium salt. The decomposition products must be removed from the catalytic solution during the operation of the exchange process to keep up a suitable level of catalysis. For economic operation it is essential that the undecomposed portion of the catalyst is recovered in a form suitable for reclamation as a solution of potassium methylamide in methylamine.

It is known also that the addition of other alkali metal methylamides to the potassium methylamide - methylamine catalytic solution used for the enrichment of deuterium in hydrogen streams has many advantages. In particular the addition of lithium methylamide to solutions of potassium methylamide in methylamine leads to more advantageous operating conditions and also reduces the rate of thermal decomposition of the catalyst solution. The thermal decomposition of the mixed catalytic solution leads to a number of impurities but especially to the alkali metal salts of N,N'-dimethylformamidine. As with the potassium methylamide the decomposition products must be removed from the catalytic solution during the enrichment process to maintain a suitable level of catalysis. For economic operation it is essential that the undecomposed portion of the alkali metal methylamides be recovered in a form suitable for reclamation.

An object of the present invention is to provide a method for the removal of impurities from alkali metal alkylamides.

Another object of the present invention is to reclaim alkali metal alkylamides, whether used individually or in mixtures, so as to regenerate the active catalyst for the aforementioned deuterium enrichment process.

A further object of the invention is the provision of a process for preparing alkali metal amides.

It has been found, (and this is one aspect of the present invention) that the reaction of alkali metal alkylamides with ammonia leads to the formation of alkali metal amides, whereas the alkali metal salts of the thermal decomposition products of the alkali metal alkylamides do not react with ammonia. The solubilities of the alkali metal amides in primary alkylamines, and specifically in methylamine, is considerably different from the solubilities of the alkali metal salts of the decomposition products, and this difference in solubility is sufficient to permit a separation of undecomposed alkali metal alkylamides from the decomposition products. Thus, since the alkali metal alkylamides can be readily regenerated from the corresponding alkali metal amides, it has been found that alkali metal alkylamides can be obtained in purified form, and that these purified alkali metal alkylamides are suitable for use as catalysts in a deuterium enrichment process.

In one aspect the present invention resides in a process for the preparation of alkali metal amides which comprises reacting the corresponding alkali metal alkylamides with ammonia.

In a further aspect this invention resides in a process for reclaiming alkali metal alkylamides in purified form which comprises: adding ammonia to a solution in a primary alkylamine of alkali metal alkylamides together with impurities including N,N'-dialkylformamidine, and allowing reaction between the ammonia and said alkali metal alkylamides to occur; separating the alkali metal amides so obtained from the solution; and reacting said alkali metal amides with a primary alkylamine to form alkali metal alkylamides free from said impurities.

More specifically, the present invention provides a process for reclaiming potassium methylamide in purified form, which comprises the steps of: (a) adding ammonia to a solution of potassium methylamide in methylamine, and allowing reaction between the ammonia and said potassium methylamide to occur, said solution including impurities such as N,N'-dimethylformamidine which do not react with the ammonia; (b) separating the potassium amide so obtained from the mother liquor which contains said impurities; (c) distilling the mother liquor; and (d) contacting the distillate, comprised of methylamine containing ammonia, with the separated potassium amide and allowing reaction between said methylamine and said potassium amide to occur under conditions where $NH_3$ is removed, whereby a solution in methylamine of potassium methylamide, essentially freed of said impurities, is obtained. As noted the process includes rectifying this latter solution to also remove the ammonia, i.e., by distilling with a small column to allow $NH_3$ removal overhead and its return to the amine in (a).

Also provided by this invention is a process for reclaiming mixed alkali metal methylamides (e.g., a mixture of lithium and potassium methylamides) in purified form, which comprises the steps of: (a) adding ammonia to a solution of mixed alkali metal methylamides in methylamine, and allowing reaction between the ammonia and said mixed alkali metal methylamides to occur, said solution including impurities such as N,N'-dimethylformamidine which do not react with the ammonia; (b) separating the mixture of alkali metal amides so obtained from the mother liquor containing said impurities; (c) distilling the mother liquor; and (d) contacting the distillate, comprised of methylamine containing ammonia, with the separated mixture of alkali metal amides and allowing reaction between said methylamine and said mixture of alkali metal amides to occur under conditions where $NH_3$ is removed, whereby a solution in methylamine of mixed alkali metal methylamides, essentially freed of said impurities, is obtained. The latter solution is rectified to remove ammonia in the manner previously indicated.

By removing a portion of potassium methylamide solution in methylamine employed as the catalytic solution in the aforementioned deuterium enrichment process, and adding ammonia thereto the potassium methylamide present is precipitated as potassium amide according to the reaction

impure

The precipitated potassium amide is separated by filtration or centrifugation from the mother liquors containing the potassium salt of N,N'-dimethylformamidine which does not react with ammonia. The mother liquors are evaporated to leave a residue of the decomposition products and the methylamine distillate, containing some ammonia, is returned to the solid potassium amide. Under conditions which favour removal of ammonia from the reaction zone, e.g., rectifying by use of a suitable fractional distillation column with ammonia withdrawal, the potassium amide reacts with methylamine to form a solution of potassium methylamide in methylamine. This solution may be used, if desired, to replenish, in part, the catalyst for the deuterium enrichment process lost by decomposition.

The process is applicable to any alkali metal alkylamide as well as to mixtures thereof. Thus, if ammonia is added to a solution in methylamine of a mixture of lithium and potassium methylamides the lithium and potassium methylamides present are precipitated as lithium amide and potassium amide in accordance with the reactions

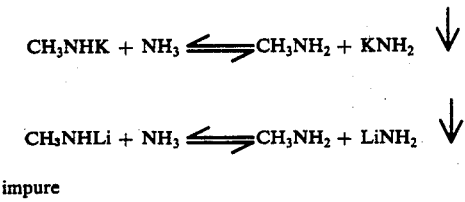

impure

The precipitated amides are separated by filtration or centrifugation from the mother liquors containing the salts of the decomposition products, which do not react with ammonia. The mother liquors are evaporated to leave a residue of the decomposition products and the methylamine distillate containing ammonia is returned to the mixture of the solid lithium and potassium amides. Under conditions which favour removal of ammonia from the reaction zone, e.g., rectifying by use of a suitable fractional distillation column, the alkali metal amides react with methylamine to form a solution of the alkali metal methylamides in methylamine which is used, if desired, to replenish in part the catalyst lost by decomposition. In this way, the undecomposed part of the catalytic solution is separated from decomposition products and regenerated in a form suitable for re-use in the deuterium exchange process after addition of fresh alkali metal methylamides in the amounts required to restore the original composition.

The various alkali metals are operative including mixtures thereof. Of particular interest are those whose alkyl amides are catalytically active for H-D exchange in amine systems. Suitable mixtures are described in U.S. Pat. No. 3,995,017 of W. J. Holtslander and R. E. Johnson, issued Nov. 30, 1976. Lower alkyl groups in particular may be used in the alkali metal alkyl amide, e.g., methyl, ethyl and propyl.

We shall now further describe the invention with reference to the enclosed drawing in which:

FIG. 1 is a schematic flow diagram illustrating a process for the reclamation of an alkali metal alkyl amide, for example, of potassium methylamide.

Referring now to FIG. 1, a catalytic solution purge stream (A) from a deuterium enrichment process and containing potassium methylamide and its decomposition products, primarily the potassium salt of N,N'-dimethylformamidine, in solution in methylamine, is passed through line 10 into a reaction vessel 12 where it is mixed with an ammonia-rich solution of ammonia in methylamine (H) supplied to the reaction vessel via line 14. The resulting slurry (B) of solid potassium amide in a solution of the decomposition products and excess ammonia in methylamine is then passed through line 16 to pressure filter 18, where it is filtered. The filtrate (D) is introduced by line 20 into a fractional distillation column 22 where it is distilled, and a concentrated solution of the decomposition products (E) is withdrawn from reboiler 24 by way of line 26. The distillate (F), consisting of a dilute solution of ammoni in methylamine, passes from the top of fractionating column 22 via line 28 and is used to back-wash the solid potassium amide (C) from the pressure filter 18. The slurry of potassium amide in said dilute solution of ammonia in methylamine formed thereby is then introduced into the fractionating still 29 by way of lines 32 and 34. An ammonia-rich distillate (H) is withdrawn from the top of the fractionating column 30 and is recycled to reaction vessel 12 by way of line 14. A solution of essentially pure potassium methylamide in methylamine (G) is withdrawn from the reboiler 36 through line 38 and returned to the deuterium enriching process. (not illustrated).

The process is self-sufficient in ammonia and may be operated as a continuous, semi-continuous or batch process as desired.

The amount of ammonia used to precipitate potassium amide from the partially decomposed solution is not critical. Any excess of ammonia, over an equimolar amount based on the potassium methylamide present, used to increase the efficiency of the amide precipitation may be recovered, with the ammonia which reacts to form potassium amide, in the regeneration stage of the process. It is not necessary to add pure ammonia for the precipitation of potassium amide; mixtures of ammonia and methylamine may be used. In fact, the use of mixtures of ammonia and methylamine is advantageous in that it is possible to achieve considerable economies in the regeneration step by taking such a mixture from the top of the fractional distillation column and thus enabling a simpler fractionating column to be used and also leading to savings in energy.

From 1 to 10 moles of ammonia per mole of potassium methylamide to be recovered may be used but a mole ratio of from 2-5:1 is preferred. The mole ratio may be chosen to give an economic balance between loss of valuable potassium methylamide in the mother liquor at low ammonia levels and the increasing cost of separating ammonia from methylamine in the regeneration stage at high ammonia levels.

The process may be operated at ambient temperatures and at moderate pressures sufficient to maintain the methylamine in the liquid phase. Minor operating advantages may be obtained by operating at other temperatures and pressures as will be readily apparent to those skilled in the art.

In a similar manner a mixture of alkali metal methylamides may be treated. Thus in this embodiment of the invention, referring to FIG. 1, the catalytic solution purge stream (A) from a deuterium enrichment process which is treated contains a mixture of alkali metal methylamides and their decomposition products mainly the alkali metal salts of N,N'-dimethylformamidine, in methylamine solution. This solution is passed through line 10 into reaction vessel 12 where it is mixed with an ammonia rich solution of ammonia in methylamine (H) which is supplied to the reaction vessel via line 14, and reaction of the ammonia with the mixture of alkali metal methylamides is allowed to take place. The resulting slurry (B) of a mixture of solid alkali metal amides in a solution of th decomposition products and excess ammonia in methylamine is then passed through line 16 to pressure filter 18 where the mixture of alkali metal amides is separated from the solution. The filtrate (D) is introduced via line 20 into fractional distillation column 22 where it is distilled, and a concentrated solution of the decomposition products (E) is withdrawn from the reboiler 24 through line 26. The distillate (F), consisting of a dilute solution of ammonia in methylamine, passes from the top of fractionating column 22 through line 28 and is used to back-wash the mixture of solid alkali metal amides (C) from the pressure filter 18. The resulting slurry is introduced into the fractionating still 29 through lines 32 and 34. An ammonia-rich distillate (H) is withdrawn from the top of the fractionating column 30 and is recycled by way of line 14 to reaction vessel 12. A solution of essentially pure mixed alkali metal methylamides in methylamine (G) is withdrawn from the reboiler 36 through line 38 and returned to the deuterium enrichment process (not illustrated).

The process conditions, such as the amounts of ammonia to be used relative to the mixed alkali metal methylamides to be purified, and the operable temperatures and pressures, are similar to those previously mentioned herein in connection with the process for the reclamation of potassium methylamide in purified form.

The following examples further illustrate the invention. It is to be understood however, that the invention is not to be limited to what is exemplified thereby.

EXAMPLE 1

Addition of ammonia (108.8 mmol) to a solution of potassium methylamide in methylamine containing 47.6 mmol of potassium methylamide precipitated 86 percent of the potassium methylamide as potassium amide.

Addition of ammonia (6.24 mmol/g of solution) to a solution in methylamine of the potassium salt of N,N'-dimethylformamidine (0.47 mmol/g of solution) caused no precipitation.

Addition of ammonia (92 mmol) to a partially thermolyzed solution of potassium methylamide in methylamine containing 27.0 mmol of potassium methylamide and 16.7 mmol of the potassium salt of N,N'-dimethylformamidine precipitated 74% of the potassium methylamide as potassium amide. The solution concentration of the potassium salt of N,N'-dimethylformamidine remained unchanged.

EXAMPLE 2

Addition of ammonia (1.54 mmol/g of solution) to a solution of lithium methylamide (0.84 mmol/g of solution) and potassium methylamide (0.50 mmol/g of solution) at 25° C precipitates over 98 percent of the alkali metal methylamides as their amides.

A solution of lithium methylamide and potassium methylamide containing initially lithium methylamide (0.52 mmol/g of solution) and potassium methylamide (0.43 mmol/g of solution) was thermally decomposed to a mixture containing 0.31 mmol/g of solution of the salts of the major decomposition product, N,N'-dimethylformamidine. Ammonia (2.98 mmol/g mixture) was added, and the mixture was agitated for 16 hours and filtered. The filtrate contained only 0.1 meq/g of solution of methylamide ion but still contained essentially all the N,N'-dimethylformamidine (0.29 mmol/g of solution); alkali metal ion analysis showed the presence of a trace of lithium ions (0.01 meq/g of solution) and potassium ions (0.31 meq/g of solution). Analysis of the residue showed it to consist of lithium amide (equivalent to 0.49 meq/g of the initial solution) and potassium amide (equivalent to 0.17 meq/g of the initial solution). The residue therefore, contained essentially all the alkali metals corresponding to the undecomposed methylamides.

The embodiments of the invention in which an exclusive property or privilege is claimed are defined as follows:

1. A process for reclaiming alkali metal alkylamide systems in purified form which comprises:
   adding ammonia to a solution in a primary alkylamine of an alkali metal alkylamide together with impurities, including N,N'-dialkylformamidine, and allowing reaction between the ammonia and said alkali metal alkylamide to occur;
   separating the alkali metal amide so obtained from the solution; and
   reacting said alkali metal amide with a primary alkylamine under conditions where NH$_3$ is removed to form alkali metal alkylamide free from said impurities.

2. A process as in claim 1, wherein the alkali metal comprises sodium.

3. A process as in claim 1, wherein the alkali metal comprises lithium.

4. A process as in claim 1, wherein the alkali metal comprises potassium.

5. A process as in claim 1, in which the starting material is an alkylamide of a mixture of alkali metals, and the product is an alkylamide of said mixture of alkali metals, in purified form.

6. A process as in claim 1, comprising the steps of:
   a. adding ammonia to a solution of potassium methylamide in methylamine, and allowing reaction between the ammonia and said potassium methylamide to occur, said solution including impurities which do not react with the ammonia;
   b. separating the potassium amide so obtained from the mother liquor which contains said impurities;
   c. distilling the mother liquor; and
   d. contacting the distillate, comprised of methylamine containing ammonia, with the separated potassium amide and allowing reaction between said methylamine and said potassium amide to occur under ammonia removal conditions, whereby a solution in methylamine of potassium methylamide, essentially freed of said impurities, is obtained.

7. A process as in claim 1, comprising the steps of:
   a. adding ammonia to a solution of mixed alkali metal methylamides in methylamine, and allowing reaction between the ammonia and said mixed alkali metal methylamides to occur, said solution including impurities which do not react with the ammob. separating the mixture of alkali metal amides so obtained from the mother liquor containing said impurities;

c. distilling the mother liquor; and d. contacting the distillate, comprised of methylamine containing ammonia, with the separated mixture of alkali metal amides and allowing reaction between said methylamine and said mixture of alkali metal amides to occur under ammonia removal conditions, whereby a solution in methylamine of mixed alkali metal methylamides, essentially freed of said impurities, is obtained.

8. A process as in claim 7, wherein the starting material is a mixture of lithium and potassium methylamides, and the final product is a mixture of lithium and potassium methylamides, in purified form.

9. A process as in claim 6, comprising the steps of:

a. contacting a solution in methylamine of potassium methylamide and decomposition products thereof, in a reaction vessel, with an ammonia-rich solution of ammonia in methylamine, until a slurry of potassium amide in a solution of said decomposition products and excess ammonia in methylamine is formed;

b. separating the potassium amide from said solution by filtration;

c. subjecting the filtrate to fractional distillation;

d. contacting the distillate, consisting of a dilute solution of ammonia in methylamine, with said recovered potassium amide, whereby a slurry is obtained;

e. rectifying said slurry in a fractionating column, whereby there is obtained a solution of essentially pure potassium methylamide in methylamine and an overhead of ammonia with some methylamine;

f. withdrawing from the top of said fractionating column an ammonia-rich solution of ammonia in methylamine, and recycling said solution to said reaction vessel; and g. recovering said solution of essentially pure potassium methylamide in methylamine.

10. A process as in claim 7, comprising the steps of:

a. contacting a solution in methylamine of mixed alkali metal methylamides and decomposition products thereof, in a reaction vessel, with an ammonia-rich solution of ammonia in methylamine, until a slurry of a mixture of solid alkali metal amides in a solution of said decomposition products and excess ammonia in methylamine is formed;

b. separating the mixture of alkali metal amides from said solution by filtration;

c. subjecting the filtrate to fractional distillation;

d. contacting the distillate, consisting of a dilute solution of ammonia in methylamine, with said mixture of alkali metal amides, whereby a slurry is obtained;

e. rectifying said slurry in a fractionating column, whereby there is obtained a solution of essentially pure mixed alkali metal methylamides in methylamine, and an overhead of ammonia with some methylamine;

f. withdrawing from the top of said fractionating column an ammonia-rich solution of ammonia in methylamine, and recycling said solution to said reaction vessel; and g. recovering said solution of essentially pure mixed alkali metal methylamides in methylamine.

11. A process as in claim 10, wherein the starting material is a mixture of lithium and potassium methylamides, and the final product is a mixture of lithium and potassium methylamides in purified form.

12. A process as in claim 9 wherein the solution of potassium methylamide in methylamine of starting step (a) is derived from a catalytic process for the enrichment of deuterium in hydrogen, and said product solution of essentially pure potassium methylamide in methylamine from step (e) is suitable for recycling to said deuterium enrichment process.

13. A process as in claim 10 wherein the solution of mixed alkali metal methylamides of starting step (a) is derived from a catalytic process for the enrichment of deuterium in hydrogen, and said product solution of essentially pure mixed alkali metal methylamides in methylamine from step (e) is suitable for recycling to said deuterium enrichment process.

14. A process as in claim 6 wherein the amount of ammonia added to the potassium methylamide solution is from 1 to 10 moles of ammonia per mole of potassium methylamide.

15. A process as in claim 8 wherein the amount of ammonia added to the solution of mixed lithium and potassium methylamides is from 1 to 10 moles of ammonia per mole of said mixed lithium and potassium methylamides.

16. A process as in claim 4 wherein the mole ratio of ammonia to potassium methylamide is from 2:1 to 5:1.

17. A process as in claim 15 wherein the mole ratio of ammonia to said mixed lithium and potassium methylamides is from 2:1 to 5:1.

* * * * *